United States Patent
Belanger et al.

(10) Patent No.: US 10,391,982 B2
(45) Date of Patent: Aug. 27, 2019

(54) LIGHTED VEHICLE WASH CONVEYOR ASSEMBLY

(71) Applicant: WashMe Properties, LLC, Northville, MI (US)

(72) Inventors: Michael J. Belanger, Northville, MI (US); Barry S. Turner, Novi, MI (US)

(73) Assignee: WashMe Properties, LLC, Northville, MI (US)

( * ) Notice: Subject to any disclaimer, the term of this patent is extended or adjusted under 35 U.S.C. 154(b) by 238 days.

(21) Appl. No.: 15/481,650

(22) Filed: Apr. 7, 2017

(65) Prior Publication Data

US 2017/0291583 A1  Oct. 12, 2017

Related U.S. Application Data

(60) Provisional application No. 62/319,904, filed on Apr. 8, 2016.

(51) Int. Cl.
*B60S 3/00* (2006.01)
*B60S 3/04* (2006.01)
*B65G 19/02* (2006.01)

(52) U.S. Cl.
CPC .............. *B60S 3/004* (2013.01); *B65G 19/02* (2013.01); *B60S 3/00* (2013.01); *B60S 3/04* (2013.01)

(58) Field of Classification Search
CPC ...................................................... B60S 3/04
See application file for complete search history.

(56) References Cited

U.S. PATENT DOCUMENTS

| | | | | |
|---|---|---|---|---|
| 3,370,596 A * | 2/1968 | Daum | ....................... | B60S 3/04 134/107 |
| 3,701,356 A * | 10/1972 | Hanna | ....................... | B60S 3/04 134/113 |
| 7,243,605 B1 * | 7/2007 | Belanger | ................. | B60S 3/004 104/172.1 |
| 8,819,887 B2 * | 9/2014 | Belanger | .............. | A46B 13/001 15/179 |
| 2009/0250086 A1 * | 10/2009 | Belanger | ................. | B60S 3/004 134/57 R |
| 2010/0272916 A1 * | 10/2010 | Falbaum | ................... | B60S 3/04 427/427.2 |

(Continued)

OTHER PUBLICATIONS

European International Search Report dated Jul. 6, 2017.

*Primary Examiner* — Jason C Smith
(74) *Attorney, Agent, or Firm* — John S. Artz; Dickinson Wright PLLC (57) ABSTRACT

A lighted conveyor assembly for a vehicle wash system for moving a vehicle through a vehicle wash process including a vehicle treatment area and including a pair of guide rails for engaging the wheels of the vehicle to keep it on the conveyor. The guide rails including a protective sheath disposed thereon for preventing damage to the wheels of the vehicle. The protective sheath is made of a translucent material and contains a light source, which may be an LED strip light, and is configured to emit light that can be seen by a vehicle occupant in the vehicle treatment area. The light source may display a variety of patterns or effects, including specific colors or patterns to indicate that associated features of the car wash process are active. The light source may also be seen from outside of the treatment area to provide a positive impression for potential customers.

18 Claims, 6 Drawing Sheets

(56) References Cited

U.S. PATENT DOCUMENTS

| | | | | |
|---|---|---|---|---|
| 2011/0197935 A1* | 8/2011 | Belanger | .................. | B60S 3/04 134/123 |
| 2014/0345071 A1* | 11/2014 | Belanger | .................. | B60S 3/06 15/53.2 |
| 2014/0366287 A1* | 12/2014 | Belanger | ................. | F21V 33/00 15/3 |
| 2014/0366290 A1* | 12/2014 | Belanger | .............. | A46B 13/001 15/53.1 |
| 2016/0059831 A1* | 3/2016 | Belanger | .................. | B60S 3/04 134/56 R |
| 2016/0063591 A1* | 3/2016 | Belanger | ............ | G06Q 30/0623 705/26.61 |
| 2016/0264104 A1* | 9/2016 | Belanger | .................. | B60S 3/04 |
| 2017/0291583 A1* | 10/2017 | Belanger | ................ | B65G 19/02 |
| 2018/0281751 A1* | 10/2018 | Belanger | ................ | B60S 3/004 |

\* cited by examiner

LIGHTED VEHICLE WASH CONVEYOR ASSEMBLY

RELATED APPLICATIONS

This application claims the benefit of U.S. Provisional Application No. 62/319,904 filed Apr. 8, 2016, entitled "LIGHTED VEHICLE WASH CONVEYOR ASSEMBLY", which is hereby incorporated by reference as though set forth fully herein.

TECHNICAL FIELD

The present disclosure relates generally to a lighted vehicle wash component. More particularly, the present disclosure relates to a conveyor assembly for a vehicle wash facility which employs lights to provide improved aesthetics.

BACKGROUND OF THE DISCLOSURE

Vehicle wash facilities are generally known to have dark and dirty environments, which can make them unattractive to customers and potential customers. This environment results, in part, from the fact that current rotary brush wash components typically employ a cylindrical central hub design that is densely populated with a plurality of washing elements such that the hub is not visible either at rest or during operation. This densely populated hub also serves to block a great deal of light from a vehicle occupant as the wash component approaches the vehicle during the vehicle wash process due to the large volume of the washing elements. This can result in a significant darkening of the vehicle interior and an unpleasant wash experience for the vehicle occupant. Combine this darkness with windshields and side windows that are often covered with soapy water and visibility for vehicle occupants within current vehicle wash facilities is generally very low.

Consequently, some wash owners have made an attempt to brighten this environment and enhance a user's wash experience though the use of lighted arches and signs, to create somewhat of a "carnival" feel. Many vehicle wash facilities also employ lights and lighted signs as a way to advertise extra wash services like tire shine, sealer wax, and triple foam as well as to drive traffic to and create more revenue for their vehicle wash facility. While these lighted arches and lighted signs may be effective in drawing consumer attention to the wash or to the extra services they offer, the lighting is very selective and does little to improve the overall environment within the vehicle wash facility.

Additionally, these lighted arches and signs are generally provided outside of or at the entrance end of the vehicle wash system in order to try and attract potential customers to take advantage of the vehicle wash services or to provide a positive impression for customers before they enter the vehicle wash system. More recently, as discussed in Applicants' U.S. Pat. No. 8,819,887, lights have been incorporated into vehicle wash components and these lights rotate as the components rotate. This configuration allows the lights to be more easily visible to consumers while their vehicle is being treated such that the vehicle wash experience is less dark and intimidating. However, lighting effects have not been used in the conveyor assemblies of typical vehicle wash facilities and thus this area of the wash facility remains dark and can be intimidating to consumers. Moreover, any lights in other parts of the wash facility have only a limited effect on the marketing of wash services to vehicles passing thereby as they cannot be readily seen.

Another disadvantage of current vehicle wash configurations is that they share a largely similar, utilitarian appearance that makes it correspondingly difficult for wash owners to provide a distinctive or memorable service offering to their customers. Lighted arches and signs that are used in existing wash facilities do little to overcome this problem as any attempted branding created thereby is obstructed from the view of vehicle occupants during the wash process, as discussed above. Moreover, while the lighted brushes in U.S. Pat. No. 8,819,887 provide significant improvements in this regard, the dark vehicle conveyor area can negatively affect a user's wash experience.

It would thus be desirable to provide a vehicle wash component that addresses these issues.

SUMMARY OF THE DISCLOSURE

It is therefore an aspect of the present disclosure to provide a lighted conveyor assembly for a vehicle wash facility that provides improved aesthetics.

It is another aspect of the present disclosure to provide a lighted conveyor assembly for a vehicle wash facility that enhances customer experience during the wash process.

It is a further aspect of the present disclosure to provide a lighted conveyor assembly for a vehicle wash facility that assists in creating and/or enhancing brand recognition.

It is a still another aspect of the present disclosure to provide a lighted conveyor assembly for a vehicle wash facility that can brighten the environment therein.

It is yet another aspect of the present disclosure to provide a lighted conveyor assembly for a vehicle wash facility that yields enhanced brightness and aesthetics when not in use.

It is still yet another aspect of the present disclosure to provide a lighted conveyor assembly for a vehicle wash facility that provides confirmation to a customer that a particular event is occurring, such as an ordered service.

In accordance with the above and the other aspects of the present disclosure, a lighted conveyor assembly is provided. The lighted conveyor assembly includes a floor with a pair of sidewalls running along the length of the floor. A guide rail runs along the top of each sidewall, with a protective sheath of resilient and translucent material covering the guide rail. A strip light is disposed within the protective sheath and configured to emit light that can be seen by a vehicle occupant in the vehicle treatment area.

According to another aspect of the present disclosure, a conveyor assembly for a vehicle wash facility comprises: a pair of opposed sidewalls, with each sidewall topped by a guide rail; at least one of the guide rails further including a protective sheath covering at least a portion of the guide rail; and a strip light associated with the protective sheath and connected to a controller, the controller sending signals to the strip light to switch the strip light between an on mode and an off mode and the controller determining a color emitted by the strip light when the strip light is in the on mode.

Pursuant to a further aspect of the disclosure, a guide rail of a vehicle wash conveyor comprises: a guide rail having a protective sheath covering at least a portion of the guide rail; and a strip light associated with the protective sheath and connected to a controller, the controller sending signals to the strip light to switch the strip light between an on mode and an off mode and to determine a color emitted by the strip light when the strip light is in the on mode.

According to a still further aspect, a protective sheath of a guide rail of a vehicle conveyor comprises: a protective sheath comprising a translucent resilient material and having a generally L-shaped cross-sectional shape; the protective sheath having an outer edge connected to a second corner and defining a lower surface there between; the protective sheath further including a leg connected to the second corner and having a foot extending to a third corner and a toe.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

According to an aspect, the present disclosure relates to a component for a vehicle wash system. More specifically, the present disclosure relates to a lighted conveyor assembly 20 for use in moving a vehicle through a vehicle wash process.

Figure 1:
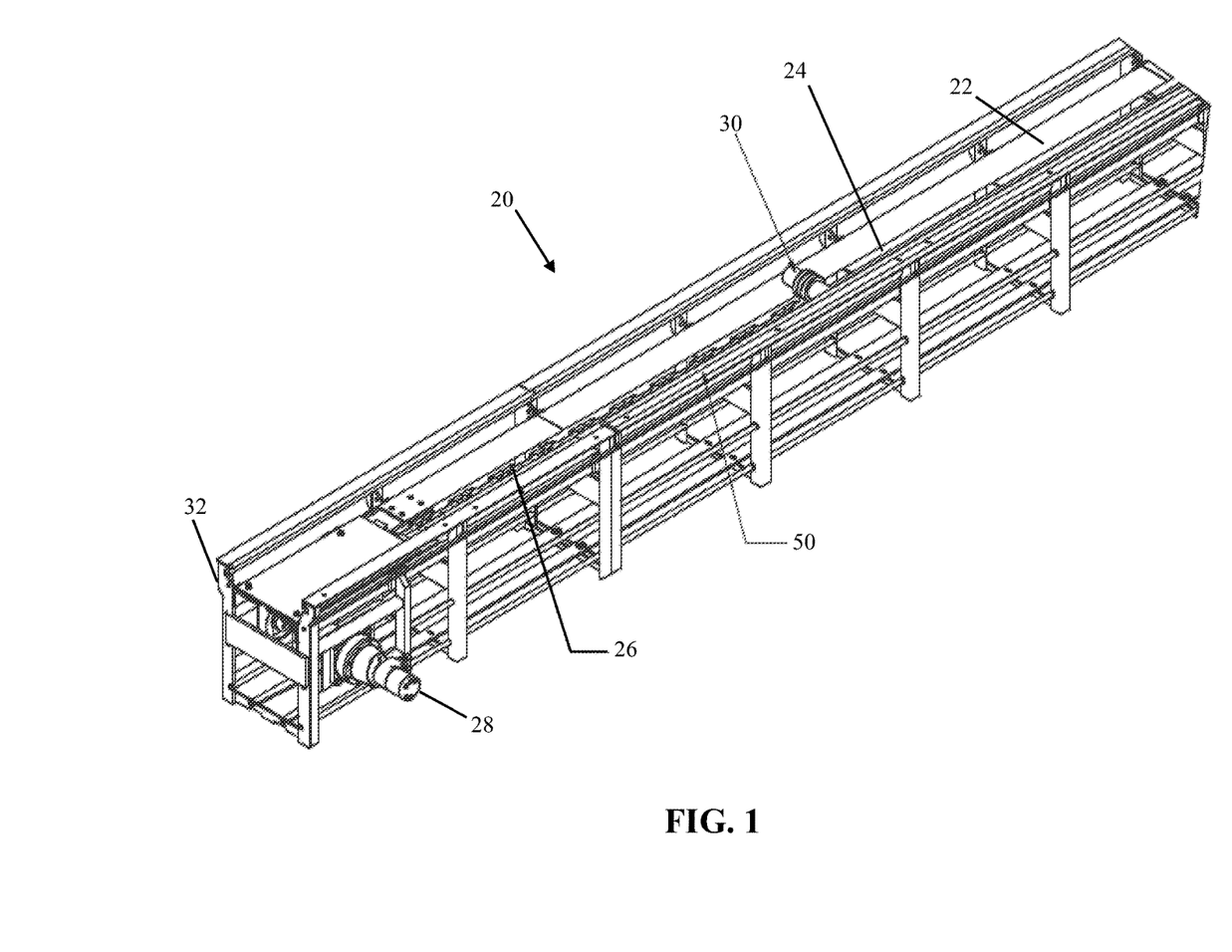
FIG. 1 is a perspective view of a segment of a vehicle wash conveyor assembly including a pair of guide rails in accordance with an aspect of the present disclosure.
Figure 2:
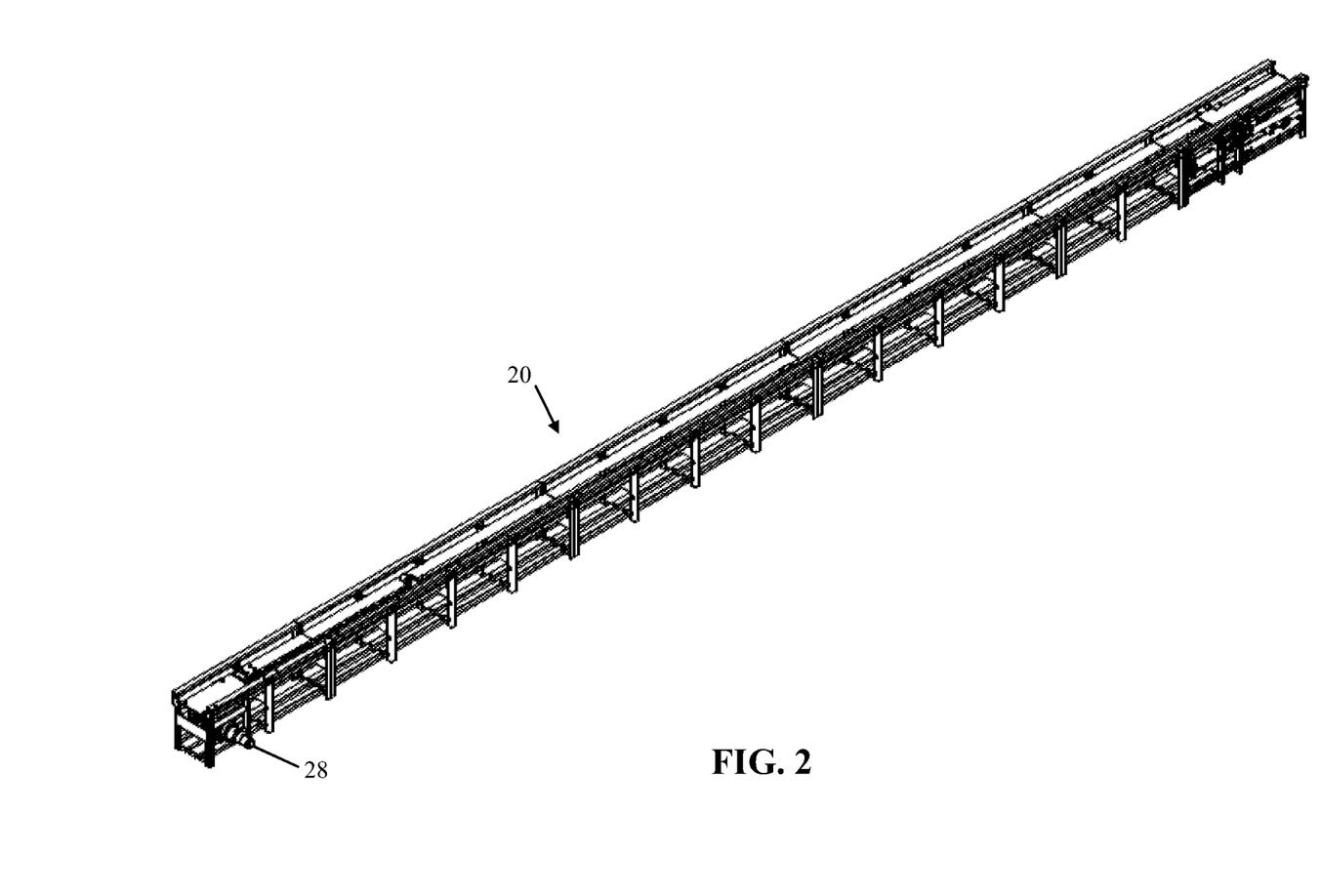
FIG. 2 is a perspective view of a vehicle wash conveyor assembly including a pair of guide rails in accordance with an aspect of the present disclosure.

According to an aspect, and as shown in FIG. 1, the lighted conveyor assembly 20 may include a floor 22 extending through the vehicle wash. The floor 22 may have a width of about twelve inches for supporting at least one of the wheels of the vehicle as the vehicle moves through the vehicle wash. The floor 22 may define a gap 24 running longitudinally therethrough with a chain 26 located below the floor 22 and driven by a motor 28 and connected through the gap 24 to a dolly 30 which moves over the floor 22 for engaging the wheel of the vehicle on the floor 22 and for moving the vehicle through the vehicle wash. The gap 24 may run through the center of the floor 22. The floor 22 may also include solid segments without a gap 24, such as adjacent to the beginning or the end of the vehicle wash. It should be appreciated that the term "wheel", as used in this disclosure includes a rim, tire, or combination thereof of a vehicle.

Figure 3:
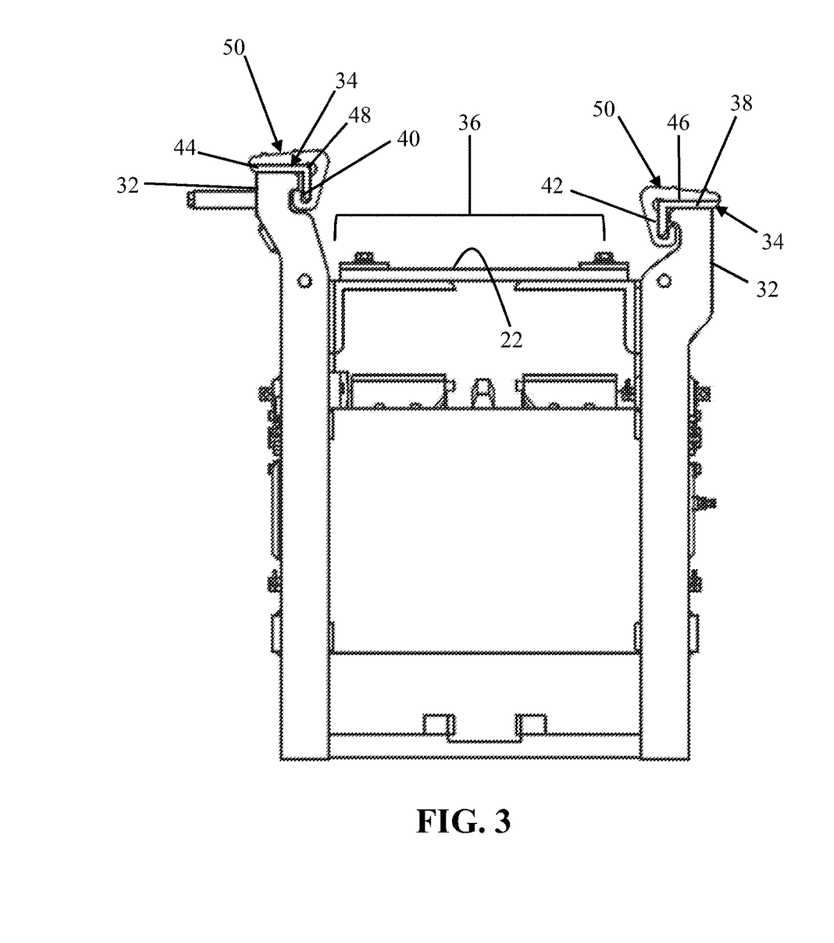
FIG. 3 is an end view of a vehicle wash conveyor assembly including a pair of guide rails in accordance with an aspect of the present disclosure.
Figure 4:
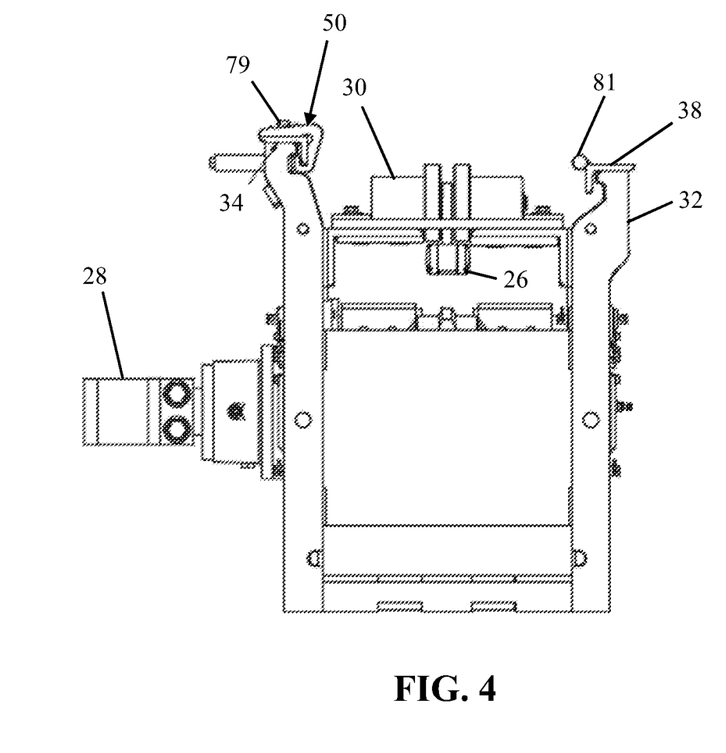
FIG. 4 is an end view of a vehicle wash conveyor assembly including a pair of guide rails in accordance with an aspect of the present disclosure.

According to an aspect, and as best shown on FIGS. 3, and 4, a pair of sides 32 extend generally perpendicularly upwardly from and along the length of the floor 22. A guide rail 34 of metal is disposed on top of each sidewall 32, opposite the floor 22, for engaging the wheel of the vehicle to keep the wheel on the floor 22 of the lighted conveyor assembly 20. The sidewalls 32 and the guide rails 34 defining a trough 36 above the floor 22 for holding the wheel as the vehicle is moved though the vehicle wash. The guide rails 34 may each include a support angle 38 having a generally L-shaped cross-section with a lower portion 40 extending generally perpendicular to the floor 22 and defining a guide surface 42 facing into the trough 36. The support angle 38 may also include upper portion 44 which extends outwardly and perpendicularly to the lower portion 40 with an upper surface 46 and a first corner 48 between the lower portion 40 and the upper portion 44.

Figure 6:
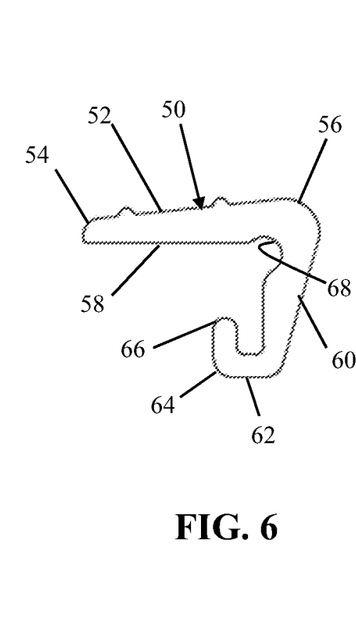
FIG. 6 is a cross-sectional view of a sheath for a conveyor guide rail in accordance with an aspect of the present disclosure.
Figure 7:
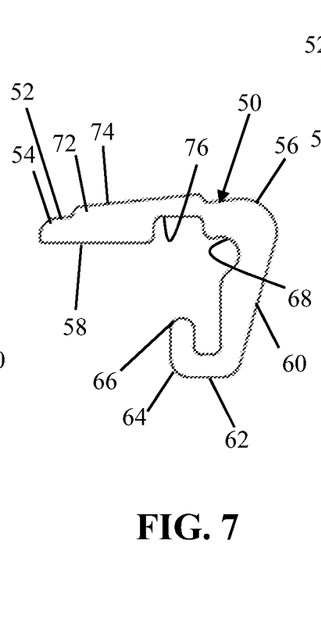
FIG. 7 is a cross-sectional view of a sheath for a conveyor guide rail in accordance with an aspect of the present disclosure.
Figure 8:
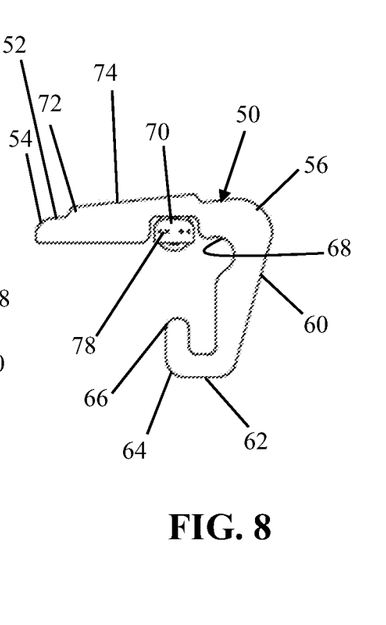
FIG. 8 is a cross-sectional view of a sheath for a conveyor guide rail in accordance with an aspect of the present disclosure.

According to an aspect, a protective sheath 50 of resilient material, such as plastic or rubber or the like, may cover the guide rail 34 for preventing damage to the wheels of the vehicle when the wheel engages the guide rail 34. As best shown in FIGS. 6-8, the protective sheath 50 may have a generally L-shaped cross-section with a top 52 extending between an outer edge 54 and a second corner 56 and defining a lower surface 58 therebetween. A leg 60 may extend from the second corner 56 generally perpendicularly to the top 52 for covering the guide surface 42 of the lower portion 40 of the support angle 38. The leg 60 may include a foot 62 extending perpendicularly therefrom. The leg 60 may further include the foot 62 extending to a third corner 64 to define a toe 66 that extends upwardly toward the top 52 for wrapping-around the lower portion 40 of the guide rail 34. The leg 60 may define a first indentation 68 inside the second corner 56 for allowing the protective sheath 50 to be flexed open for installation on or removal from the guide rail 34. As shown in FIGS. 6-8, the first indentation 68 may have a semi-circular cross section.

According to an aspect, a strip light 70 may be disposed in the protective sheath 50 for illuminating the lighted conveyor assembly 20. The protective sheath 50 may be made of a translucent or transparent material for transmitting light from the strip light 70. The protective sheath 50 may define a raised portion 72 that extends upwardly from the top 52 with a lens 74 extending in a plane generally parallel to the upper portion 44 of the support angle 38 for projecting light from the strip light 70 outwardly from the lighted conveyor assembly 20. It should be appreciated that the lens 74 may also be formed with a convex or concave shape, or a combination thereof, and that the size and shape of the raised portion 72, including the lens 74, may be different at different portions of the lighted conveyor assembly 20 to change the projected pattern of illumination from the strip light 70 or for other purposes such as fitting under a piece of equipment. It will be appreciated that the protective sheath 50 can take on a variety of different configurations and may be formed of different materials and may be formed of different colors. It will also be appreciated that the protective sheath 50 may be translucent or transparent.

According to an aspect, and as shown in FIG. 4, one or more fasteners 79 may hold the protective sheath 50 onto the support angle 38 of the guide rails 34. According to another aspect, one or more of the guide rails 34 may be configured as a non-protected guide rail 34 without a protective sheath 50. Such a non-protected guide rail 34 may be used on an inner sidewall 32 such that any marring or other signs of contact with the wheel is not apparent. A non-protected guide rail 34 may include a bumper 81, which may made of metal and may be disposed on the first corner 48.

FIGS. 7 and 8 illustrate a protective sheath 50 according to a further aspect of the disclosure with the lower surface 58 of the protective sheath 50 defining a second indentation 76 for receiving the strip light 70, which may be adjacent the second corner 56 and below the lens 74. The second indentation 76 may have a generally rectangular cross-section, which may vary depending on the size and geometry of the strip light 70. Each of the strip lights 70 may include wires and an array of light emitting diodes (LEDs) 78 and may illuminate with different colors and patterns of colors at the same time in different areas or at different times. For example, the colors, patterns of colors and light intensity may vary depending on what area a vehicle is present in, and whether equipment or optional services in those are active at the time.

Figures 5A, 5B:
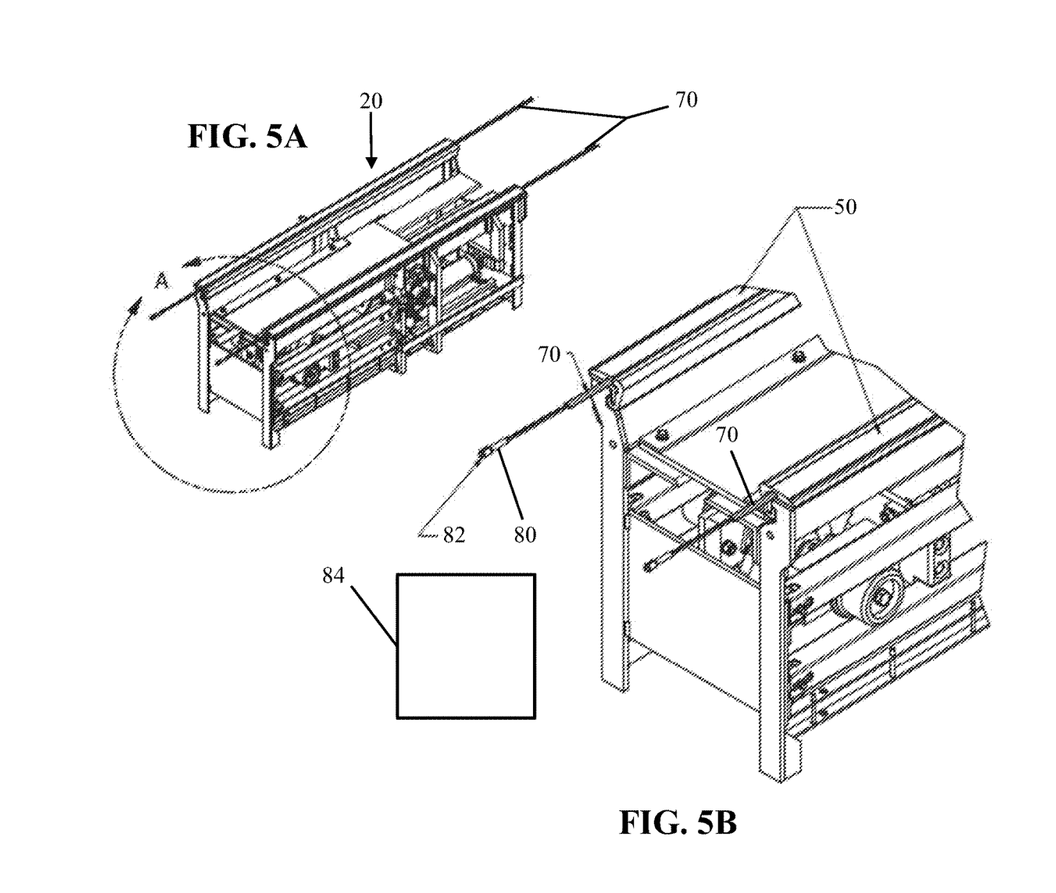
FIG. 5A is a perspective view of a segment of a vehicle wash conveyor assembly including a pair of guide rails in accordance with an aspect of the present disclosure.
FIG. 5B is an enlarged perspective view of the segment of the vehicle wash conveyor assembly of FIG. 5A.

According to an aspect, and as best shown in FIGS. 5A and 5B, the strip light 70 may extend to an end 80 which may include an electrical connector 82 for supplying power and control signals to illumination sources, such as LEDs 78, in the strip light 70 via a connection to a controller 84 as shown in FIG. 5B. The actual electrical connection between the controller 84 and the electrical connector 82 is not shown for simplicity sake; however it may comprise any known electrical connection as known in the art. It should be appreciated that other illumination sources, including but not limited to incandescent bulbs, fluorescent bulbs, and lasers, may be used. The strip light 70 may also be lighted with remotely located illumination sources, such as through fiber-optics or light pipes or by lasers or other light sources controlled by controller 84.

According to an aspect, the patterns of colors and lights may be synchronized with music, or other sounds. The patterns, colors, and intensity of light may vary depending on different operating modes, such as daytime, nighttime, or a party/disco mode. The lighting may also be set to seasonal modes, which display more of specific colors or color patterns, such as red for Valentine's Day, green for St. Patrick's Day, red and green for Christmas, and the like. According to a further aspect, the lighted conveyor assembly 20 may include "house lights," maintenance, or cleaning modes, or any combination thereof which cause the strip lights 70 to illuminate with a constant color and intensity, which may, for example, be full brightness and white light.

The strip light 70 may be an array of light emitting diodes (LEDs) 78; however a variety of other suitable illumination sources may be employed. According to an aspect, the illumination sources may be LEDs 78 that are configured to emit light in accordance with the RGB color convention as directed by a controller 84. For example, the strip light 70 may be directed to emit a variety of different colors. According to another aspect, the controller 84 may be configured to cycle the strip light 70 through a variety of different colors. According to an aspect, the strip light 70 extends for the length of the guide rail 34. It will be appreciated that it could extend a lesser portion of the length.

According to a further aspect, the protective sheath 50 could serve as a light pipe such that the strip light 70 is positioned to illuminate the interior of the protective sheath 50 and make the sheath 50 glow to provide a lighted effect as directed by the controller 84. It will be appreciated that the strip light 70 could be disposed in a variety of other locations to illuminate the protective sheath 50.

According to a further aspect, the controller 84 can turn the strip lights 70 on to emit light through the protective sheath 50 (enabled mode) and off such that no light is emitted from the strip lights 70 (disabled mode). It will also be appreciated that the controller 84 can be in communication with other light sources in the vehicle wash system such that the strip lights 70 may be activated and synchronized with other light sources in connection with a package confirmation function, as is disclosed in Applicant's co-pending U.S. patent application Ser. No. 14/687,704, filed Apr. 15, 2015, and entitled "Vehicle Wash Package Selection Confirmation System" and/or an active site marketing function, as is disclosed in Applicant's co-pending U.S. patent application Ser. No. 14/695,773, filed Apr. 24, 2015, and entitled "Active Site Marketing Vehicle Wash System", both of which are hereby incorporated by reference as though set forth fully herein.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

We claim:

1. A conveyor assembly for conveying a vehicle through a vehicle wash facility comprising:
   a pair of opposed sidewalls, with each sidewall topped by a guide rail, each of said guide rails secured to its sidewall and capable of engaging a sidewall of a vehicle tire being conveyed in said conveyor assembly;
   at least one of said guide rails further including a protective sheath having an indentation therein and covering at least a portion of said guide rail; and
   a strip light received in said indentation of said protective sheath and connected to a controller, said controller sending signals to said strip light to switch said strip light between an on mode and an off mode and said controller determining a color emitted by said strip light when said strip light is in said on mode.

2. A conveyor assembly for conveying a vehicle through a vehicle wash facility as recited in claim 1, wherein said protective sheath is a light pipe for said strip light.

3. A conveyor assembly for conveying a vehicle through a vehicle wash facility as recited in claim 1, wherein both of said guide rails include a protective sheath and wherein each protective sheath covers a strip light.

4. A conveyor assembly for conveying a vehicle through a vehicle wash facility as recited in claim 1, wherein one of said guide rails does not include a protective sheath, said guide rail including a bumper disposed on said guide rail.

5. A conveyor assembly for conveying a vehicle through a vehicle wash facility as recited in claim 1, wherein said protective sheath further includes a raised portion and said raised portion has a lens, said strip light emitting light through said lens when said strip light is in said on mode.

6. A conveyor assembly for conveying a vehicle through a vehicle wash facility as recited in claim 1, wherein said strip light is at least one of a plurality of light emitting diodes (LEDs), an incandescent bulb, a fluorescent bulb, a laser, a fiber-optic, a light pipe, or a combination thereof.

7. A conveyor assembly for conveying a vehicle through a vehicle wash facility as recited in claim 1, wherein said guide rail has an L-shaped cross-sectional shape having an upper surface connected to a guide surface through a first corner and wherein said protective sheath covers at least said upper surface, said first corner, and said guide surface of said guide rail.

8. A conveyor assembly for conveying a vehicle through a vehicle wash facility as recited in claim 1, wherein said protective sheath is formed of a translucent resilient material.

9. A conveyor assembly for conveying a vehicle through a vehicle wash facility as recited in claim 1, wherein said protective sheath is formed of a translucent resilient material comprising plastic, rubber, or a mixture thereof.

10. A guide rail of a vehicle wash conveyor for conveying a vehicle through a vehicle wash facility comprising:
    a guide rail having a protective sheath which includes an indentation and contacts said guide rail, is capable of engaging a sidewall of a vehicle tire and covers at least a portion of said guide rail; and
    a strip light received in said indentation of said protective sheath and connected to a controller, said controller sending signals to said strip light to switch said strip light between an on mode and an off mode and to determine a color emitted by said strip light when said strip light is in said on mode.

11. A guide rail of a vehicle wash conveyor for conveying a vehicle through a vehicle wash facility as recited in claim 10, wherein said protective sheath is a light pipe for said strip light.

12. A guide rail of a vehicle wash conveyor for conveying a vehicle through a vehicle wash facility as recited in claim 10, wherein said protective sheath further includes a raised portion and said raised portion has a lens, said strip light emitting light through said lens when said strip light is in said on mode.

13. A guide rail of a vehicle wash conveyor for conveying a vehicle through a vehicle wash facility as recited in claim 10, wherein said strip light is at least one of a plurality of light emitting diodes (LEDs), an incandescent bulb, a fluorescent bulb, a laser, a fiber-optic, a light pipe, or a combination thereof.

14. A guide rail of a vehicle wash conveyor for conveying a vehicle through a vehicle wash facility as recited in claim 10, wherein said guide rail has an L-shaped cross-sectional shape having an upper surface connected to a guide surface through a first corner and wherein said protective sheath covers at least said upper surface, said first corner, and said guide surface of said guide rail.

15. A guide rail of a vehicle wash conveyor for conveying a vehicle through a vehicle wash facility as recited in claim 10, wherein said protective sheath is formed of a translucent resilient material comprising plastic, rubber, or a mixture thereof.

16. A protective sheath of a guide rail of a vehicle conveyor for conveying a vehicle through a vehicle wash facility comprising:
    a protective sheath comprising a translucent resilient material permitting light to pass there through and having a generally L-shaped cross-sectional shape;
    said protective sheath having an outer edge connected to a second corner and defining a lower surface there between said lower surface including a second indentation configured to accommodate a strip light;
    said protective sheath further including a leg connected to said second corner and having a foot extending to a third corner and a toe.

17. A protective sheath of a guide rail of a vehicle conveyor for conveying a vehicle through a vehicle wash facility as recited in claim 16 wherein said protective sheath is a light pipe.

18. A protective sheath of a guide rail of a vehicle conveyor for conveying a vehicle through a vehicle wash facility as recited in claim 16 wherein said protective sheath further comprises a lens on a top of said protective sheath, said lens permitting light to pass through it.

* * * * *